(12) United States Patent
Yang

(10) Patent No.: US 10,421,591 B2
(45) Date of Patent: Sep. 24, 2019

(54) FLUID GUIDING DEVICE AND VACUUM CONTAINER HAVING THE SAME

(71) Applicant: Chuan-Chen Yang, Hsinchu (TW)

(72) Inventor: Chuan-Chen Yang, Hsinchu (TW)

( * ) Notice: Subject to any disclaimer, the term of this patent is extended or adjusted under 35 U.S.C. 154(b) by 11 days.

(21) Appl. No.: 15/927,013

(22) Filed: Mar. 20, 2018

(65) Prior Publication Data
US 2018/0319557 A1 Nov. 8, 2018

(30) Foreign Application Priority Data

May 4, 2017 (TW) .............................. 106206241 A

(51) Int. Cl.
B65D 81/20 (2006.01)
B65D 51/28 (2006.01)
A47J 47/10 (2006.01)
B65D 51/16 (2006.01)
B65D 77/22 (2006.01)

(52) U.S. Cl.
CPC .......... *B65D 51/2864* (2013.01); *A47J 47/10* (2013.01); *B65D 51/1683* (2013.01); *B65D 77/225* (2013.01); *B65D 81/2015* (2013.01); *B65D 81/2038* (2013.01)

(58) Field of Classification Search
CPC .............. B65D 81/2015; B65D 77/225; B65D 31/047; B65D 51/1683; B65D 51/2864; B65D 50/061; A47J 47/10; A47J 47/06

USPC ....................................... 220/203.4, 303, 231
See application file for complete search history.

(56) References Cited

U.S. PATENT DOCUMENTS 599,300 A * 2/1898 Mohn ................. B65D 51/1683
217/99
D758,853 S * 6/2016 Seeuwen ........................ D9/439

FOREIGN PATENT DOCUMENTS

DE 862250 C * 1/1953 ......... B65D 51/1683

* cited by examiner

Primary Examiner — Mollie Impink
(74) Attorney, Agent, or Firm — Penilla IP, APC

(57) ABSTRACT

A fluid guiding device and a vacuum container having the same comprising: a tapered plug having a tapered portion including first flow guiding grooves extending from the edge of the upper surface of the tapered portion to the guiding column, and a guiding column extending from the center of an upper surface of the tapered portion and including second flow guiding grooves formed along a longitudinal direction of the guiding column, the first flow guiding grooves each being in communication with a corresponding second flow guiding groove; and a tapered plug guide having a top opening and a guiding channel, the guiding column being inserted into the guiding channel, the guiding channel matching the guiding column and preventing the tapered portion from entering the guiding channel, the guiding channel and the second flow guiding grooves being in communication with the top opening.

17 Claims, 10 Drawing Sheets

US 10,421,591 B2

FLUID GUIDING DEVICE AND VACUUM CONTAINER HAVING THE SAME

CROSS REFERENCE TO RELATED APPLICATIONS

The present application claims priority from Taiwan Patent application No. TW106206241 filed on May 4, 2017, entitled "FLUID GUIDING DEVICE AND VACUUM CONTAINER HAVING THE SAME", the content of which is hereby incorporated by reference in their entirety for all purposes.

Technical Field

The present invention relates to a fluid guiding device and a vacuum container having the fluid guiding device.

BACKGROUND OF THE INVENTION

Description of the Prior Art

In general, there are typically domestic or industrial requirements for storing objects in a vacuum environment, such as storing food or industrial materials which are prone to be affected by environmental changes in a vacuum environment.

However, conventional anti-leak mechanisms for domestic vacuum containers on the market are too simple to maintain a desired degree of vacuum for a long time, while conventional anti-leak mechanisms for industrial vacuum storage systems are too complex, which causes a high cost and is adverse to transportation.

SUMMARY OF THE INVENTION

In view of the problems set forth above, according to a first aspect of the present invention, a fluid guiding device is provided, comprising: a tapered plug provided with a tapered portion and a guiding column extending from a center portion of an upper surface of the tapered portion, wherein the tapered portion includes first flow guiding grooves extending from the edge of the upper surface of the tapered portion to the guiding column, wherein the guiding column includes second flow guiding grooves formed along a longitudinal direction of the guiding column, and wherein the first flow guiding grooves are in communication with a corresponding one of the second flow guiding grooves; and a tapered plug guide provided with a top opening and a guiding channel, wherein the guiding column is inserted into the guiding channel, wherein the guiding channel matches the guiding column and prevents the tapered portion from entering the guiding channel, wherein the guiding channel is in communication with the top opening, and wherein the second flow guiding grooves are in communication with the top opening.

According to a second aspect of the present invention, a vacuum container is provided, comprising: a container body including a sidewall and a bottom portion, wherein the sidewall and the bottom portion are configured to define an opening and a storage space, an outer side of the bottom portion being provided with a recess which is recessed toward the storage space and in communication with the storage space, the recess being provided with an airtight ring groove; a pressure relief knob installed inside the recess; an upper cover including a top portion and a sidewall, and detachably fitted to the opening, the top portion including a first fitting hole and a second fitting hole, the second fitting hole being positioned above the first fitting hole and in communication with the first fitting hole, the first fitting hole being in communication with the storage space and provided with a tapered hole wall, an inner side of the top portion being provided with an airtight ring groove; and the fluid guiding device of the abovementioned first aspect, wherein the tapered portion is inserted into the first fitting hole and matches the tapered hole wall, and wherein the tapered plug guide is fitted in the second fitting hole.

Compared to those used in conventional vacuum containers and vacuum storage systems, the fluid guiding device of the present invention has excellent anti-leak ability. The fluid guiding device of the present invention can be advantages in at least the following: maintaining a desired degree of vacuum for a long period of time, low cost, and convenience for delivery. The vacuum container of the present invention may be suitable for domestic or industrial applications.

Other aspects and advantages of the present invention may be more obvious from the following detailed description in conjunction with the accompanying drawings illustrating the principles and examples of the present invention. Additionally, well-known components and principles will not described in detail in the present disclosure, in order not to unnecessarily obscure the present invention.

BRIEF DESCRIPTION OF THE DRAWINGS

In the accompanying drawings of the present invention, same reference numbers are designated to same or similar components.

DETAILED DESCRIPTION OF THE PREFERRED EMBODIMENTS

Figure 1:
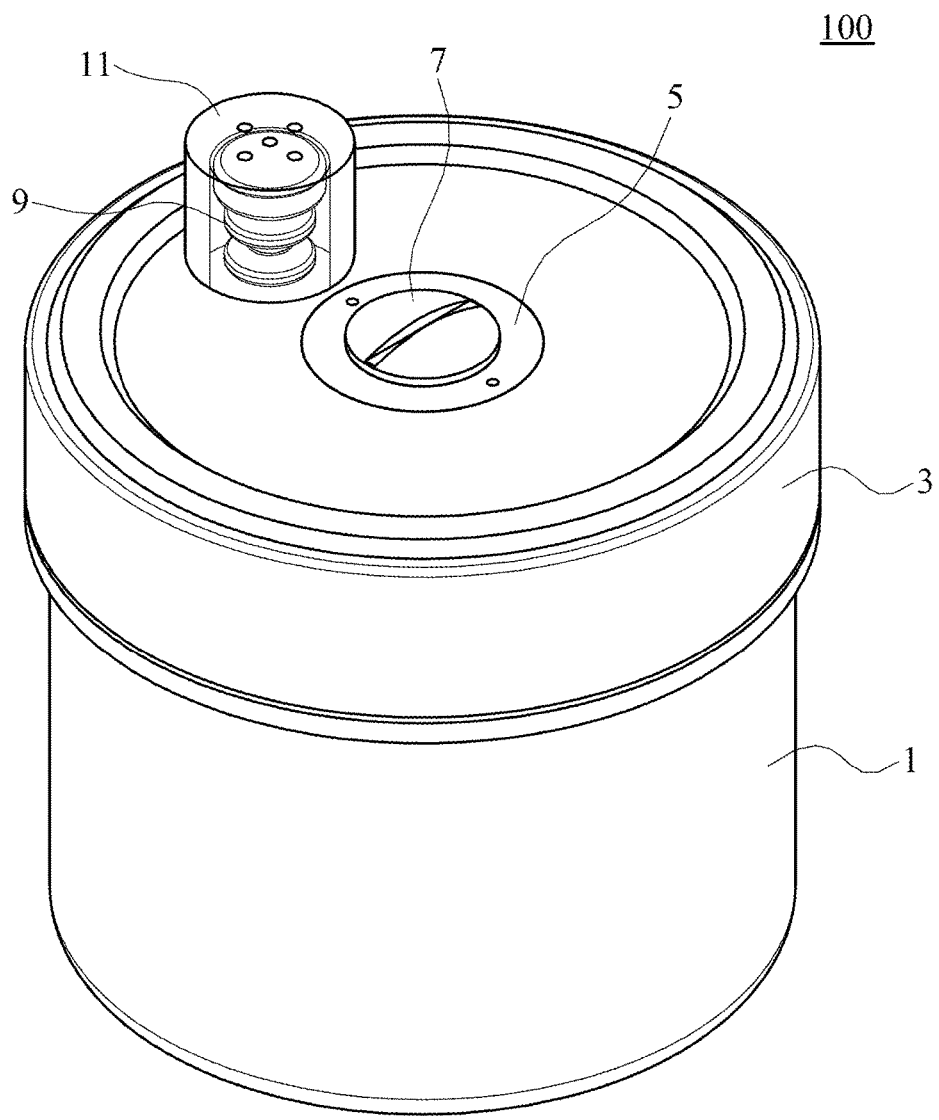
FIG. 1 is a schematic perspective view of a vacuum container according to an embodiment of the present invention.
Figure 2:
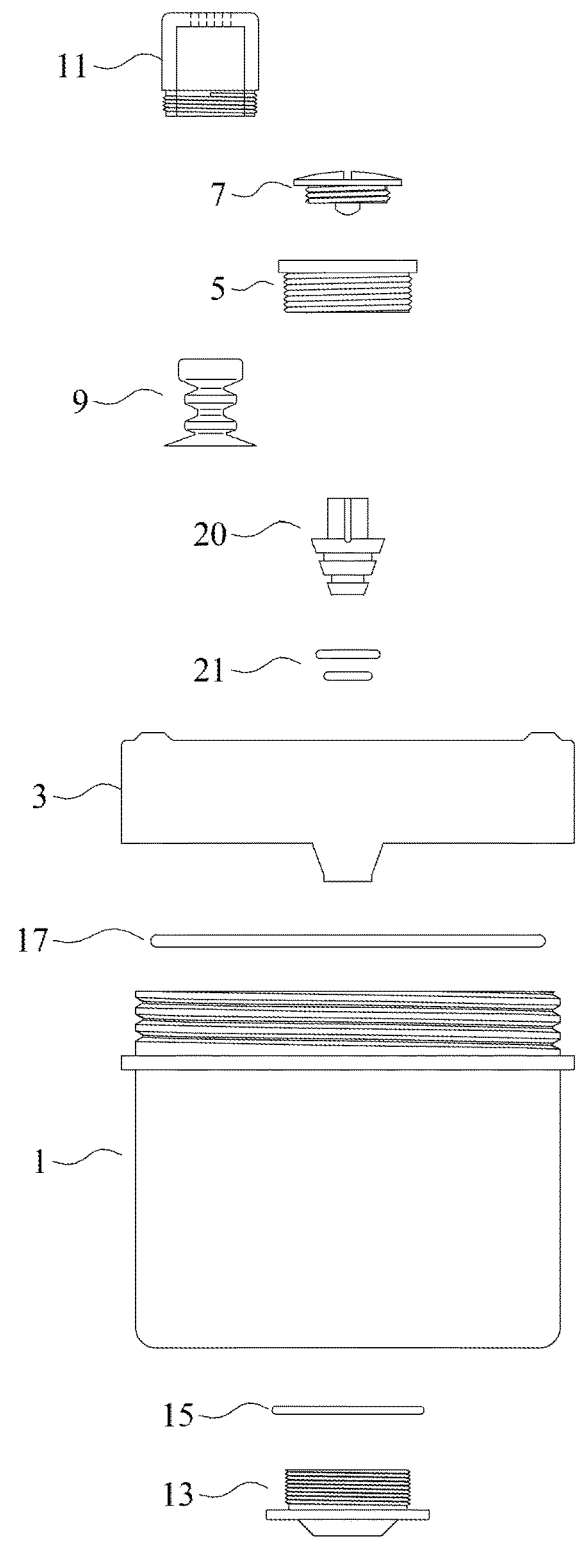
FIG. 2 is a schematic exploded view of the vacuum container shown in FIG. 1.

FIG. 1 is a schematic perspective view of a vacuum container 100 according to an embodiment of the present invention, and FIG. 2 is a schematic exploded view of the vacuum container 100 shown in FIG. 1. As shown in FIG. 1 and FIG. 2, the vacuum container 100 may comprise a container body 1, an upper cover 3, a tapered plug guide 5, and pressure relief knob 13, and a tapered plug 20, and may further comprise a vacuum displaying element 9 and a transparent cover 11. The tapered plug guide 5 and the tapered plug 20 may be combined to form the fluid guiding device of the present invention. The fluid guiding device may further comprise an anti-leak top plug 7.

The container body 1, upper cover 3, tapered plug guide 5, anti-leak top plug 7, pressure relief knob 13 and tapered plug 20 may be made of polymer materials, such as polycarbonate (PC), polypropylene (PP), polyacrylate resins, polystyrene (PS) resins, acrylonitrile-styrene (AS) resins, acrylonitrile-butadiene-styrene (ABS) resins, etc., but is not limited thereto. Suitable material(s) may be chosen depending upon actual applications and requirements.

Figure 3:
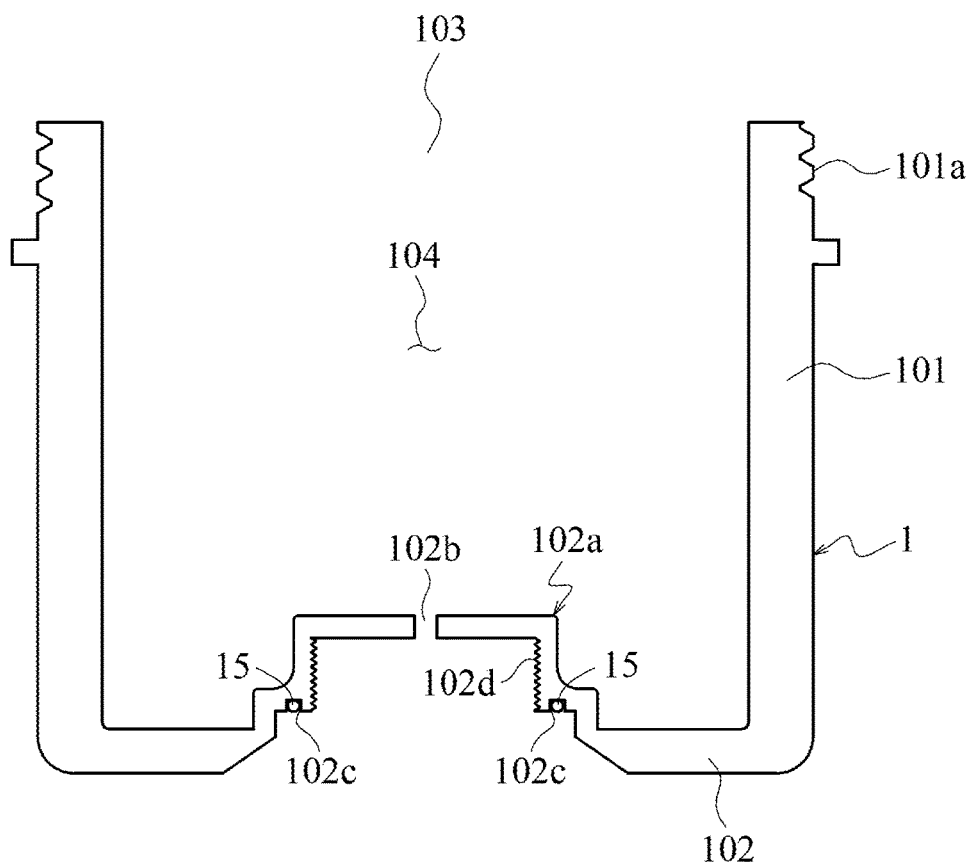
FIG. 3 is a schematic cross-sectional view of a container body and a pressure relief knob of the present invention.
Figure 3:
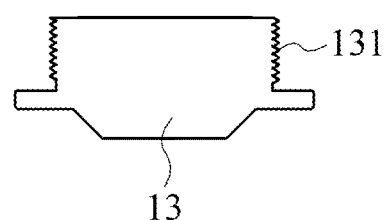

FIG. 3 is a schematic cross-sectional view of the container body 1 and the pressure relief knob 13 of the present invention. The container body 1 may include a sidewall 101 and a bottom portion 102. The sidewall 101 and the bottom portion 102 may be used to define an opening 103 and a storage space 104. The outer side of the bottom portion 102 may be provided with a recess 102a which is recessed toward the storage space 104. The recess 102a may be in communication with the storage space 104 via a through hole 102b. The pressure relief knob 13 may be installed inside the recess 102a.

The recess 102a may be provided with an airtight ring groove 102c. The airtight ring groove 102c may be configured to receive an airtight ring 15 (e.g., O-ring) for improving the air tightness between the container body 1 and the pressure relief knob 13. The recess 102a may be provided with inner thread 102d, while the pressure relief knob 13 may be provided with outer thread 131 which matches the inner thread 102d.

Figure 4:
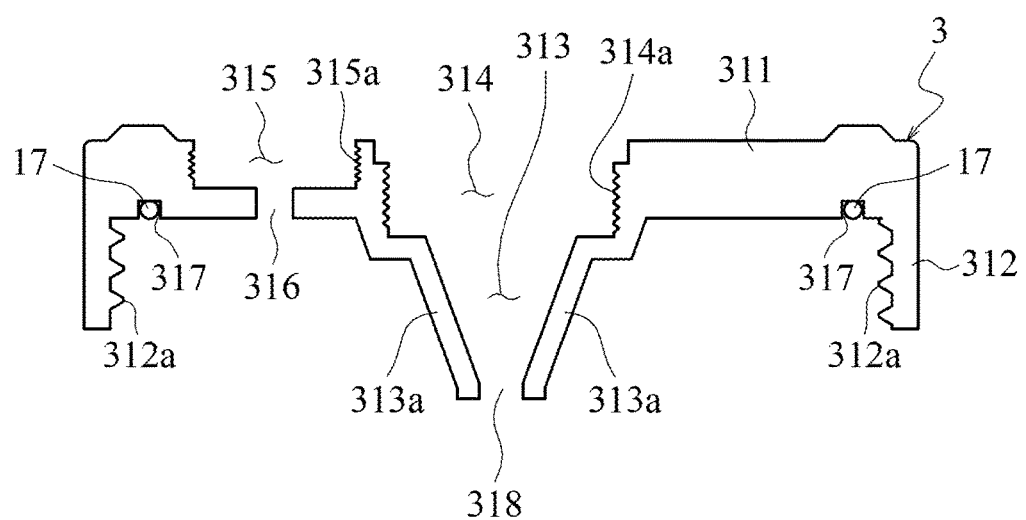
FIG. 4 is a schematic cross-sectional view of an upper cover of the present invention.

FIG. 4 is a schematic cross-sectional view of the upper cover 3 of the present invention. The upper cover 3 may include a top portion 311 and a sidewall 312, and may be fitted to the container body 1 in a detachable manner for sealing the opening 103 of the container body 1. The top portion 311 may include a first fitting hole 313 and a second fitting hole 314. The second fitting hole is positioned above the first fitting hole 313 and in communication with the first fitting hole 313. The first fitting hole 313 is in communication with a through hole 318. The through hole 318 is in communication with the storage space 104 of the container body 1. The first fitting hole may be in communication with the storage space 104 via the through hole 318. The first fitting hole 313 may be provided with a tapered hole wall 313a. In the case that the inside of the container body 1 is under negative pressure (i.e., under vacuum), it is necessary to rotate the pressure relief knob 13 for balancing the pressures inside and outside the container body 1, prior to opening the upper cover 3.

The sidewall 101 of the container body 1 may be provided with outer thread 101a, while the sidewall 312 of the upper cover 3 may be provided with inner thread 312a which matches the outer thread 101a. The inner side of the top portion 311 of the upper cover 3 may be provided with an airtight ring groove 317. The airtight ring groove 317 may be configured to receive an airtight ring 17 (e.g., O-ring) for improving the air tightness between the container body 1 and the upper cover 3.

Additionally, in an embodiment, the top portion 311 may further include a third fitting hole 315 and a through hole 316 in communication with the third fitting hole 315. The hole wall of the third fitting hole 315 may be provided with inner thread 315a. The through hole 316 is in communication with the storage space 104 of the container body 1.

Figure 5A:
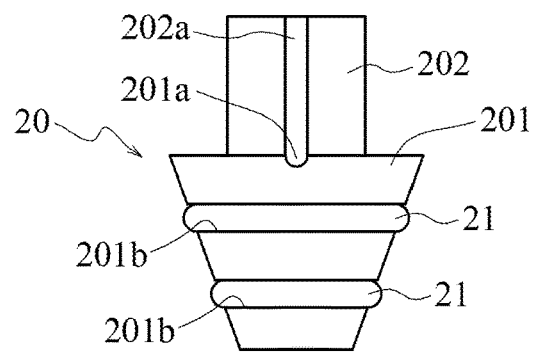
FIG. 5A is a schematic view of a tapered plug of a fluid guiding device of the present invention.
Figure 5B:
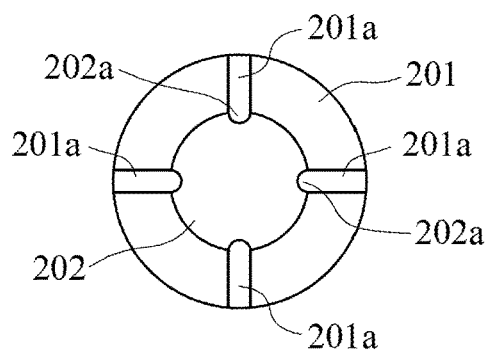
FIG. 5B is a schematic top view of the tapered plug shown in FIG. 5A.

FIG. 5A is a schematic view of the tapered plug 20 of the fluid guiding device of the present invention, and FIG. 5B is a schematic top view of the tapered plug 20 shown in FIG. 5A. As shown in FIG. 5A and FIG. 5B, the tapered plug 20 may have a tapered portion 201 and a guiding column 202 extending from the center portion of an upper surface of the tapered portion 201. The tapered portion 201 may be inserted into the first fitting hole 313 of the upper cover 3 and match the tapered hole wall 313a, while the guiding column 202 may be positioned in the second fitting hole 314 of the upper cover 3. The tapered portion 201 may have first flow guiding grooves 201a extending from the edge of the upper surface of the tapered portion 201 to the guiding column 202, while the guiding column may have second flow guiding grooves 202a formed along the longitudinal direction of the guiding column 202. Each of the first flow guiding grooves 201a is in communication with a corresponding one of the second flow guiding grooves 202a. In the present invention, the tapered portion 201 may have a circular conical shape, or a pyramid shape such as trigonal pyramid, quadrangular pyramid, etc., and the tapered hole wall 313a may have a shape which matches the shape of the tapered portion 201. For example, in an embodiment, the tapered portion 201 may have a circular conical shape, and the tapered hole wall 313a may have a circular conical shape which matched the shape of the tapered portion 201. Such matched tapered structure is helpful for improving air tightness.

In an embodiment, the tapered surface of the tapered portion 201 may be further provided with airtight ring grooves 201b. The airtight ring grooves 201b may be used to receive airtight rings 21 (e.g., O-rings) for improving the air tightness between the tapered portion 201 and the tapered hole wall 313a. Although two airtight ring grooves 201b and two airtight rings 21 are shown in FIG. 5A, the number of airtight ring grooves 201b and airtight rings 21 may be increased or reduced based on actual requirements. In other words, the tapered surface of the tapered portion 201 may be provided with one or more airtight ring grooves 201b for receiving one or more airtight rings 21.

Figure 5C:
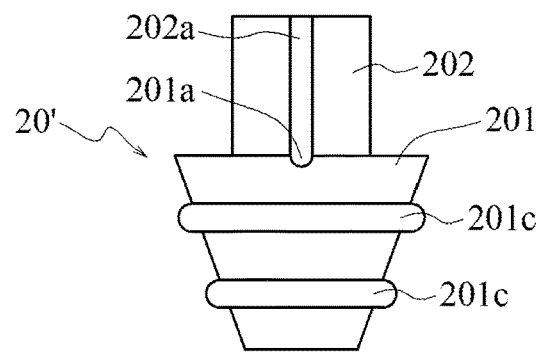
FIG. 5C is a schematic side view illustrating another embodiment of the tapered plug shown in FIG. 5A.

In addition to the polymer materials mentioned above, according to an embodiment, the tapered plug 20 may be made of elastic materials. Alternatively, according to another embodiment, the tapered plug may be made of elastic materials without any airtight ring groove 201b and airtight ring 21 provided. Alternatively, according to another embodiment of the tapered plug 20 of FIG. 5A shown in the schematic side view of FIG. 5C, the tapered plug 20' of FIG. 5C may be made of elastic materials without any airtight ring groove 201b and airtight ring 21 provided. In such case, an airtight structures 201c similar to the airtight rings 21 may be formed directly on the tapered surface of the tapered portion of the tapered plug 20'. For example, the airtight structures 201c may be annular protrusions, but are not limited thereto. In the present invention, the abovementioned elastic materials may be the same as or similar to the materials of the airtight rings. For example, the abovementioned elastic materials may be silicone or other elastic polymer materials, but are not limited thereto. Suitable materials may be chosen based on actual requirements.

Figure 6A:
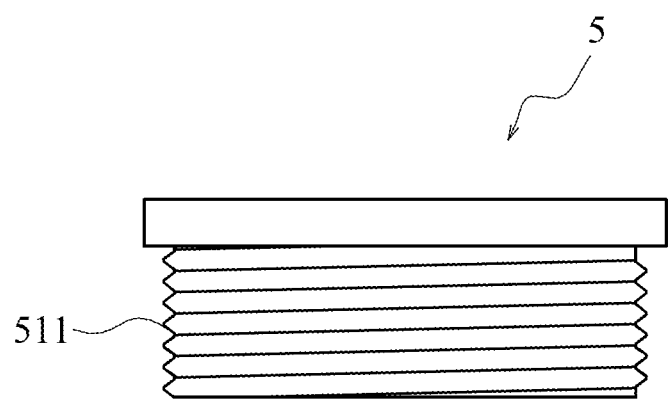
FIG. 6A is a schematic side view illustrating a tapered plug guide of the fluid guiding device of the present invention.
Figure 6B:
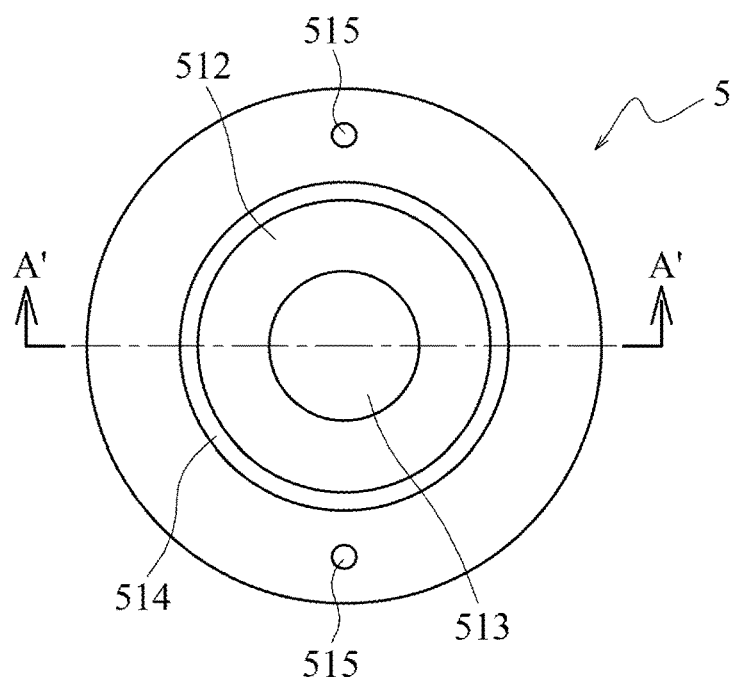
FIG. 6B is a schematic top view of the tapered plug guide shown in FIG. 6A.
Figure 6C:
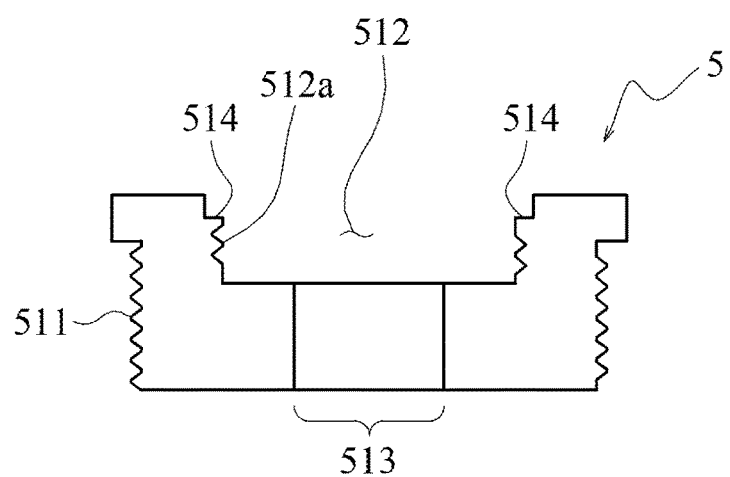
FIG. 6C is a schematic view illustrating a cross section of the tapered plug guide shown in FIG. 6B along line A-A'.
Figure 7A:
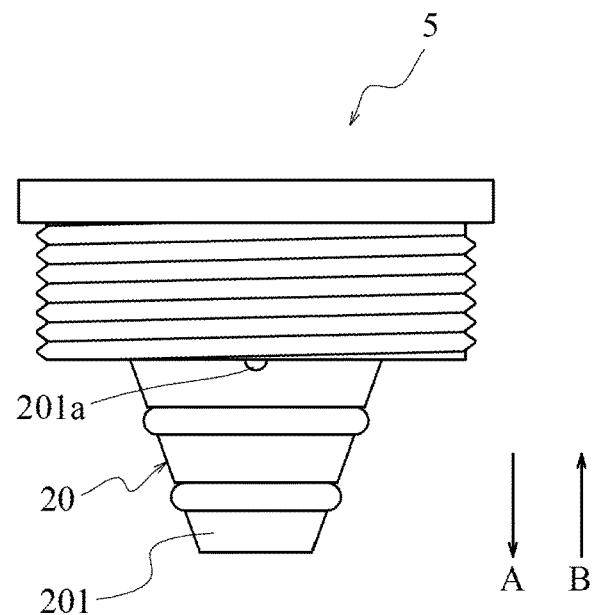
FIG. 7A is a schematic side view illustrating an assembly of the tapered plug shown in FIG. 5A and the tapered plug guide shown in FIG. 6A.
Figure 7B:
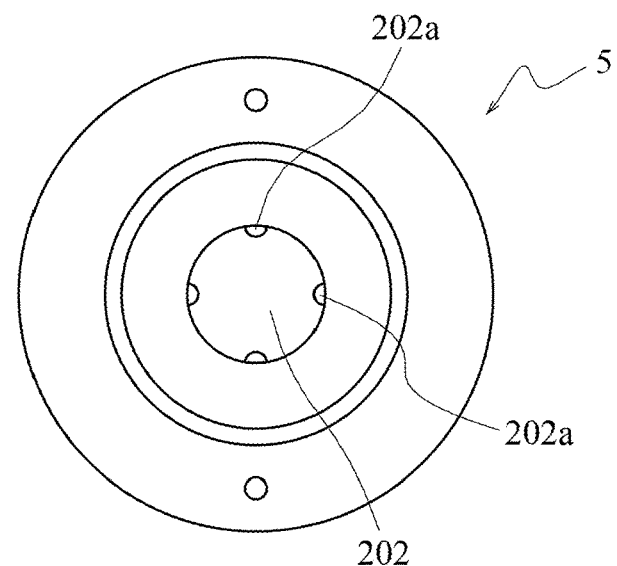
FIG. 7B is a schematic top view of the assembly shown in FIG. 7A.

FIG. 6A is a schematic side view illustrating the tapered plug guide 5 of the fluid guiding device of the present invention; FIG. 6B is a schematic top view of the tapered plug guide 5 shown in FIG. 6A; and FIG. 6C is a schematic view illustrating a cross section of the tapered plug guide 5 shown in FIG. 6B along line A-A'. FIG. 7A is a schematic side view illustrating an assembly of the tapered plug 20 shown in FIG. 5A and the tapered plug guide 5 shown in FIG. 6A; and FIG. 7B is a schematic top view of the assembly shown in FIG. 7A.

The tapered plug guide 5 may be fitted in the second fitting hole 314 of the upper cover 3, and may be provided with a top opening 512 and a guiding channel 513. The hole wall of the second fitting hole 314 may be provided with inner thread 314a, and the tapered plug guide 5 may be provided with outer thread 511 which is able to match the inner thread 314a. A restriction portion 514 may be provided on the inner wall of the top opening 512 of the tapered plug guide 5. The guiding column 202 of the tapered plug 20 may be inserted into the guiding channel 513. Moreover, a gap between the guiding column 20 and the inner wall of the guiding channel 513 may be in the range from 0.02 to 0.03 mm, which allows the guiding column 202 to be movable upward and downward in the guiding channel 513. The guiding channel 513 matches the guiding column 202, as well as preventing the tapered portion 201 from entering the guiding channel 513. The tapered plug guide 5 may be combined with the tapered plug 20 and the tapered plug 20', respectively, to form the fluid guiding device of the present invention. The top opening 512 may be connected to an external vacuum source in a detachable manner. Such external vacuum source may be, for example, a vacuum pump, a handheld air extraction device, etc., but is not limited thereto.

Once the abovementioned external vacuum source is connected to the top opening 512 and performs vacuum-pumping, the tapered plug 20 will be moved upward as indicated with arrow B in FIG. 7A, enabling the guiding column 202 to be completely inserted into the guiding channel 513. In this case, the tapered portion 201 and the tapered hole wall 313a are not tightly fitted together. The air within the container body 1 may pass through the following in order: the through hole 318, the first fitting hole 313, the first flow guiding grooves 201a, the second flow guiding grooves 202a and the top opening 512, thereby being extracted out of the container body 1. When the inside of the container body 1 is under negative pressure, the tapered plug 20 will be moved downward as indicated with arrow A in FIG. 7A. In this case, the tapered portion 201 and the tapered hole wall 313a are tightly fitted together for maintaining the degree of vacuum within the container body 1. The guiding channel 513 may ensure the vertical movement of the guiding column 202 during the vacuum-pumping, and may ensure that the tapered portion 201 accurately falls into the first fitting hole 313 after the vacuum-pumping is finished, in order to prevent poor air tightness due to angular differences. In the present invention, for example, the guiding column 202 may be cylindrical, and the guiding channel 513 may have a shape which matches the shape of the guiding column 202, i.e., the tapered plug guide 5 may have a guiding channel 513 with a circular cross-section.

The upper surface of the tapered plug guide 5 may be further provided with a tool insertion hole 515. The tool insertion hole 515 may allow a tool to be inserted therethrough for performing the disassembling and assembling of the tapered plug guide 5.

Figure 8:
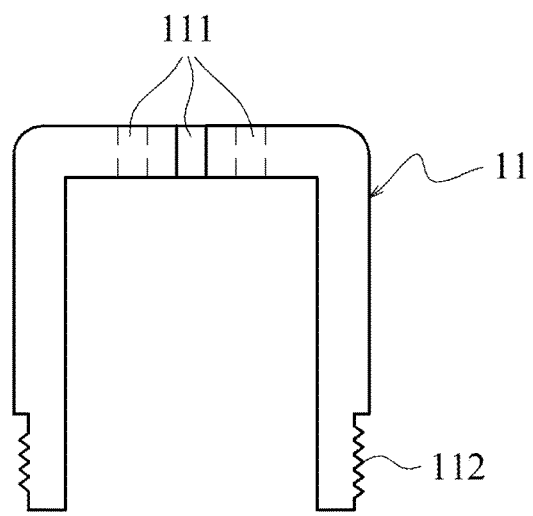
FIG. 8 is a schematic cross-sectional view of a transparent cover of the present invention.
Figure 9:
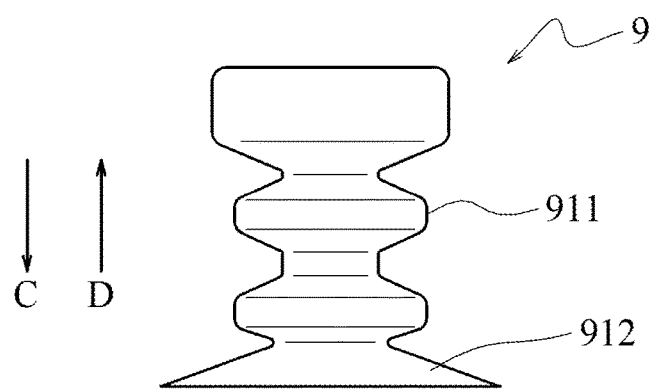
FIG. 9 is a schematic cross-sectional view of a vacuum displaying element of the present invention.

In an embodiment of the present invention, the vacuum container 100 may further include a vacuum displaying element 9 and a transparent cover 11. FIG. 8 is a schematic cross-sectional view of the transparent cover 11 of the present invention, and FIG. 9 is a schematic cross-sectional view of the vacuum displaying element 9 of the present invention.

The vacuum displaying element 9 and the transparent cover 11 may be fitted in the third fitting hole 315 of the upper cover 3 and protrude from the upper cover 3. The transparent cover 11 may be configured to enclose the vacuum displaying element 9 for the purpose of protection. The transparent cove 11 may be provided with orifices 111 which enable communication with outside environment. The transparent cover 11 may be provided with outer thread 112 which matches the inner thread 315a of the hole wall of the third fitting hole 315. The vacuum displaying element 9 may include a bellows 911 and a bottom portion 912 which has a suction disc shape and is in communication with the bellows 911. The bottom portion 912 may be configured to cover the through hole 316 of the upper cover 3, enabling the bellows 911 to be in communication with the storage space 104. When the storage space 104 is under negative pressure (i.e., vacuum), as shown with arrow C in FIG. 9, the bellows 911 contracts, and the height thereof decreases due to deformation. When the storage space 104 is under atmospheric pressure, as shown with arrow D in FIG. 9, the bellows 911 resiles to its original shape. Thus, an user can visually identify whether the storage space 104 is under vacuum. In an embodiment, the vacuum displaying element 9 may be made of elastic materials, such as but not limited to elastic materials identical to or similar to those of the airtight rings.

Figure 10:
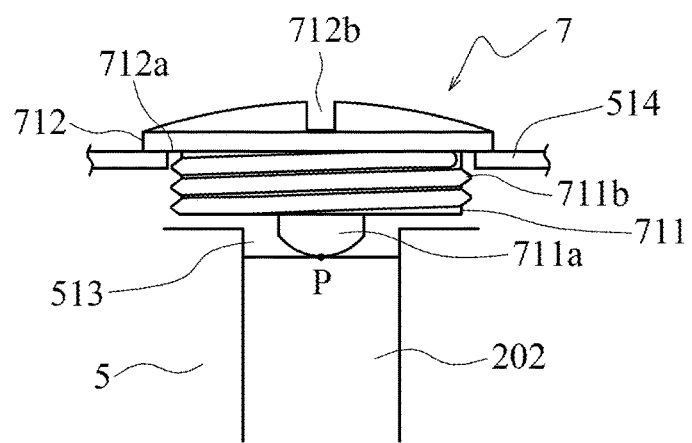
FIG. 10 is a side view of an anti-leak top plug of the present invention, which illustrates that the bottom portion of a column body of the anti-leak top plug is in point contact with the upper edge of a guide column of the tapered plug.

The fluid guiding device may further include the anti-leak top plug 7. FIG. 10 is a side view of an anti-leak top plug 7 of the present invention. After the abovementioned vacuum-pumping is finished, the anti-leak top plug 7 may be fitted in the top opening 512 of the tapered plug guide 5 in a detachable manner for pressing against the tapered plug 20, such that the tapered plug 20 does not come loose easily, thereby maintain a desired degree of vacuum for a long period of time. The anti-leak top plug 7 may include a head portion 712 and a column body 711 extending from a lower surface 712a of the head portion 712.

The wall of the top opening 512 of the tapered plug guide 5 may be provided with inner thread 512a, and the anti-leak top plug 7 may be provided with outer thread 711b which matches the inner thread 512a. The restriction portion 514 of the tapered plug guide 5 may be configured for abutting against the lower surface 712a of head portion 712 of the anti-leak top plug 7, such that downward movement of the anti-leak top plug 7 can be restricted.

In an embodiment, a bottom portion 711a of the column body 711 may be in point contact with an upper side of the guiding column, thereby pressing against the tapered plug. In addition, in an embodiment shown in FIG. 10, take the assembly of FIG. 7A as an example, when the restriction portion 514 abuts against the lower surface 712a of head portion 712 of the anti-leak top plug 7, the bottom portion 711a of the column body 711 will be in point contact (e.g., at point P) with the upper side of the guiding column 202, thereby pressing against the tapered plug 20. Such point contact can address disadvantages of surface contact. Specifically, if the bottom portion 711*a* of the column body 711 is flat and in surface contact with the upper side of the guiding column 202, it may not be able to uniformly press against the tapered plug 20 due to non-uniform surface contact. On the other hand, the point contact manner disclosed in the present invention can provide uniform pressing against the tapered plug 20, so that the tapered plug 20 does not come loose easily, and a desired degree of vacuum can be maintained for a long period of time.

The upper surface of the anti-leak top plug 7 may be provided with a tool insertion hole 721*b*. The tool insertion hole 712*b* may allow a tool to be inserted therethrough for performing the disassembling and assembling of the anti-leak top plug 7.

The fluid guiding device of the present invention, i.e., the assembly of the tapered plug and the tapered plug guide, can facilitate the air tightness of the vacuum container 100, thereby maintaining a desired degree of vacuum within the vacuum container 100 for a long period of time. The fluid guiding device not only may be applied to vacuum containers, but may also be applied to fluid delivery/storage systems requiring high impermeability, such as but not limited to liquid/gas reservoirs, liquid/gas delivery lines.

Although the present invention has been described in detail with reference to the preferred embodiments and drawings, those with ordinary skill in the art may understand that various modifications, changes, and equivalents can be made without departing from the spirit and scope of the present invention. However, these modifications, changes, and equivalents should also be included in the scope of the present invention.

The invention claimed is:

1. A fluid guiding device, comprising:
  a tapered plug provided with a tapered portion and a guiding column extending from a center portion of an upper surface of the tapered portion, wherein the tapered portion includes first flow guiding grooves extending from the edge of the upper surface of the tapered portion to the guiding column, wherein the guiding column includes second flow guiding grooves formed along a longitudinal direction of the guiding column, and wherein the first flow guiding grooves are in communication with a corresponding one of the second flow guiding grooves; and
  a tapered plug guide provided with a top opening and a guiding channel, wherein the guiding column is inserted into the guiding channel, wherein the guiding channel matches the guiding column and prevents the tapered portion from entering the guiding channel, wherein the guiding channel is in communication with the top opening, and wherein the second flow guiding grooves are in communication with the top opening.

2. The fluid guiding device of claim 1, wherein a tapered surface of the tapered portion is provided with one or more airtight ring grooves.

3. The fluid guiding device of claim 1, wherein an airtight structure is formed directly on a tapered surface of the tapered portion.

4. The fluid guiding device of claim 1, further comprising:
  an anti-leak top plug that is provided with a head portion and a column body extending from a lower surface of the head portion, and is detachably fitted in the top opening of the tapered plug guide, wherein a bottom portion of the column body is in point contact with an upper side of the guiding column, thereby pressing against the tapered plug.

5. The fluid guiding device of claim 2, further comprising:
  an anti-leak top plug that is provided with a head portion and a column body extending from a lower surface of the head portion, and is detachably fitted in the top opening of the tapered plug guide, wherein a bottom portion of the column body is in point contact with an upper side of the guiding column, thereby pressing against the tapered plug.

6. The fluid guiding device of claim 3, further comprising:
  an anti-leak top plug that is provided with a head portion and a column body extending from a lower surface of the head portion, and is detachably fitted in the top opening of the tapered plug guide, wherein a bottom portion of the column body is in point contact with an upper side of the guiding column, thereby pressing against the tapered plug.

7. The fluid guiding device of claim 4, wherein a restriction portion is provided on an inner wall of the top opening, and is configured for abutting against the lower surface of the head portion of the anti-leak top plug, such that downward movement of the anti-leak top plug is restricted.

8. The fluid guiding device of claim 5, wherein a restriction portion is provided on an inner wall of the top opening, and is configured for abutting against the lower surface of the head portion of the anti-leak top plug, such that downward movement of the anti-leak top plug is restricted.

9. The fluid guiding device of claim 6, wherein a restriction portion is provided on an inner wall of the top opening, and is configured for abutting against the lower surface of the head portion of the anti-leak top plug, such that downward movement of the anti-leak top plug is restricted.

10. The fluid guiding device of claim 1, wherein an upper surface of the tapered plug guide is provided with a tool insertion hole, wherein the tool insertion hole allows a tool to be inserted therethrough for performing disassembling and assembling of the tapered plug guide.

11. The fluid guiding device of claim 2, wherein an upper surface of the tapered plug guide is provided with a tool insertion hole, wherein the tool insertion hole allows a tool to be inserted therethrough for performing disassembling and assembling of the tapered plug guide.

12. The fluid guiding device of claim 3, wherein an upper surface of the tapered plug guide is provided with a tool insertion hole, wherein the tool insertion hole allows a tool to be inserted therethrough for performing disassembling and assembling of the tapered plug guide.

13. The fluid guiding device of claim 4, wherein an upper surface of the anti-leak top plug is provided with a tool insertion hole, wherein the tool insertion hole allows a tool to be inserted therethrough for performing disassembling and assembling of the anti-leak top plug.

14. The fluid guiding device of claim 5, wherein an upper surface of the anti-leak top plug is provided with a tool insertion hole, wherein the tool insertion hole allows a tool to be inserted therethrough for performing disassembling and assembling of the anti-leak top plug.

15. The fluid guiding device of claim 6, wherein an upper surface of the anti-leak top plug is provided with a tool insertion hole, wherein the tool insertion hole allows a tool to be inserted therethrough for performing disassembling and assembling of the anti-leak top plug.

16. A vacuum container, comprising:
  a container body including a sidewall and a bottom portion, wherein the sidewall and the bottom portion are configured to define an opening and a storage space, an outer side of the bottom portion being provided with a recess which is recessed toward the storage space and in communication with the storage space, the recess being provided with an airtight ring groove;

a pressure relief knob installed inside the recess;

an upper cover including a top portion and a sidewall, and detachably fitted to the opening, the top portion including a first fitting hole and a second fitting hole, the second fitting hole being positioned above the first fitting hole and in communication with the first fitting hole, the first fitting hole being in communication with the storage space and provided with a tapered hole wall, an inner side of the top portion being provided with an airtight ring groove; and the fluid guiding device of claim 1, wherein the tapered portion is inserted into the first fitting hole and matches the tapered hole wall, and wherein the tapered plug guide is fitted in the second fitting hole.

17. The vacuum container of claim 16, wherein the top portion of the upper cover further comprises a third fitting hole and a through hole in communication with the third fitting hole, the through hole being in communication with the storage space; and wherein the vacuum container further comprises a vacuum displaying element and a transparent cover, the vacuum displaying element and the transparent cover being fitted in the third fitting hole and protruding from the upper cover, wherein the transparent cover is configured to enclose the vacuum displaying element and is provided with orifices which enable communication with outside environment, the vacuum displaying element includes a bellows and a bottom portion which has a suction disc shape and is in communication with the bellows, the bellows being able to contract when the storage space is under negative pressure, and the bellows resiling to its original shape when the storage space is under atmospheric pressure.

* * * * *